Aug. 23, 1966 C. E. GRYCTKO 3,268,702
LOOSELY MOUNTED INDEPENDENT COUPLING MEANS FOR ADJUSTING
CONTACT PRESSURE AND CONTACT ARM POSITION
Filed Feb. 5, 1965 7 Sheets-Sheet 3

FIG. 3.

INVENTOR.
CARL E. GRYCTKO

BY
OSTROLENK, FABER, GERB & SOFFEN
ATTORNEYS

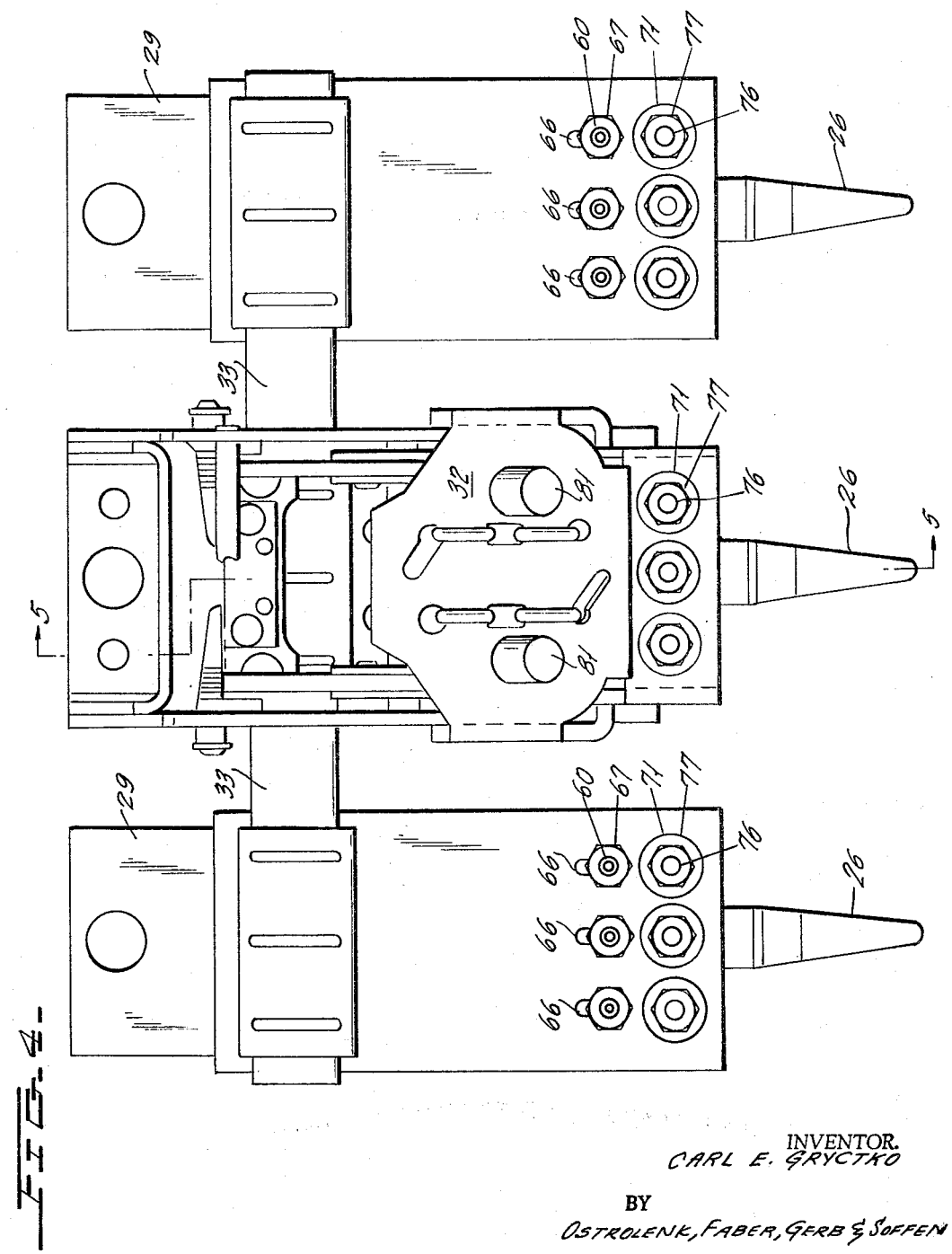

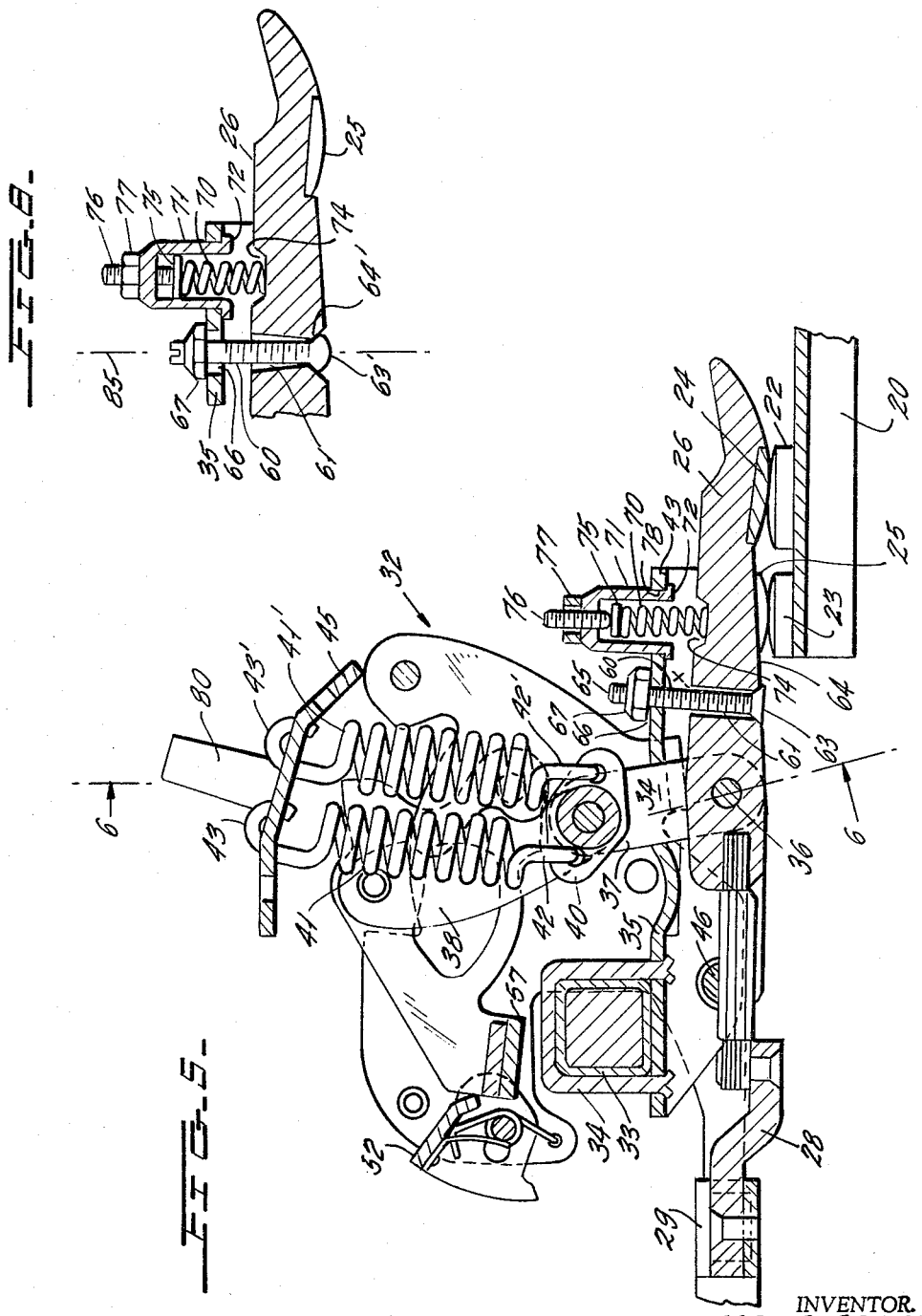

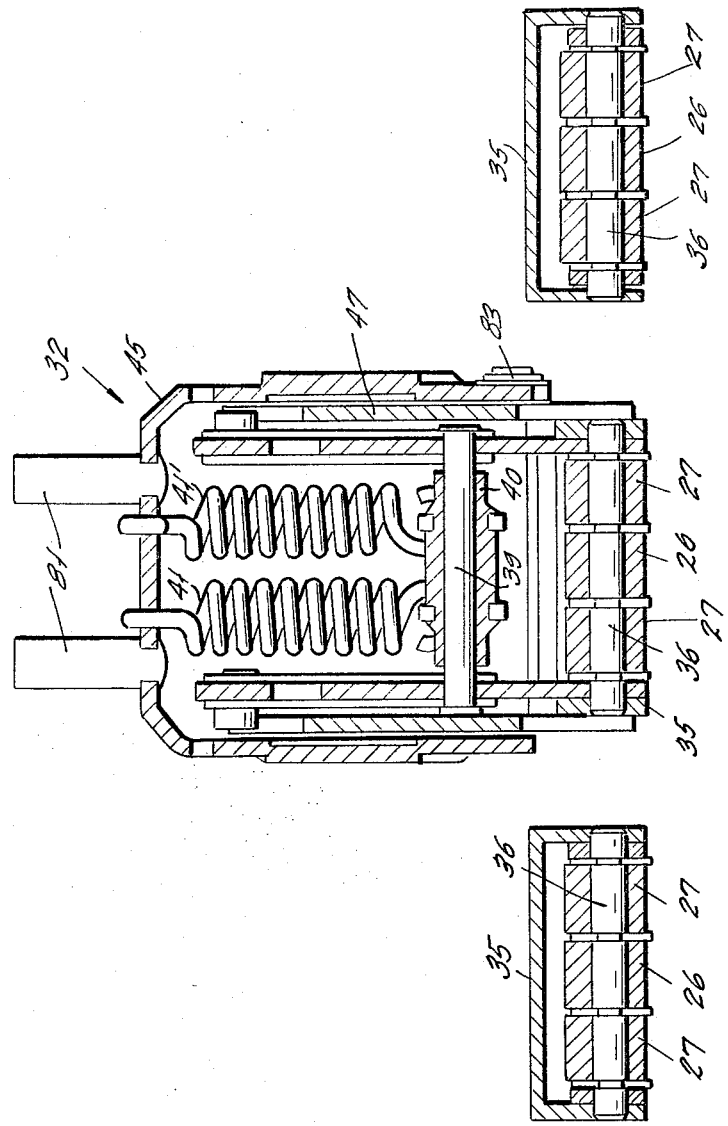

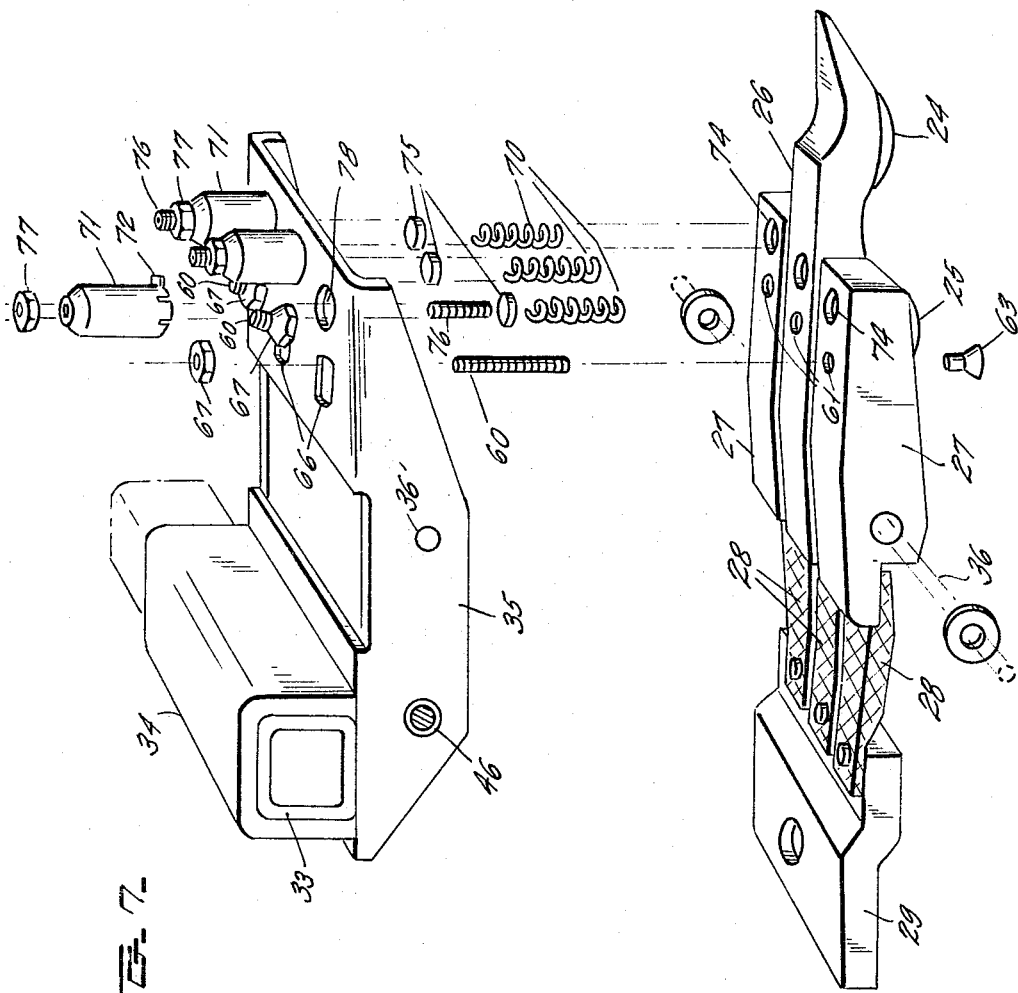

United States Patent Office 3,268,702
Patented August 23, 1966

3,268,702
LOOSELY MOUNTED INDEPENDENT COUPLING MEANS FOR ADJUSTING CONTACT PRESSURE AND CONTACT ARM POSITION
Carl E. Gryctko, Haddon Heights, N.J., assignor to I-T-E Circuit Breaker Company, Philadelphia, Pa., a corporation of Pennsylvania
Filed Feb. 5, 1965, Ser. No. 430,549
10 Claims. (Cl. 200—170)

My invention relates to circuit breakers in general, and more particularly to an improved coupling interconnection between the movable contact arm and carrier thereof which provides increased ability to withstand repeated shock loading.

In circuit breakers having quick make-and-break features, the movable contact moves at a very high rate of speed into engagement with the stationary contact upon closing of the circuit breaker. Because of this it is necessary to provide means for absorbing the energy released by the closing mechanism in a very short travel of the movable contact arm. In the circuit breaker art this is usually accomplished by providing a spring member interposed between the movable contact arm and the circuit break operating mechanism. This spring member may also serve to provide the required contact pressure between the cooperating contact pairs. It is oftentimes desirable, especially in larger frame circuit breakers, to provide an easily accessible adjustment means associated with the spring member for calibrating the contact pressures after the operating mechanism and stationary contacts have been mounted to the circuit breaker base. In order to prevent the striking of an arc, it is also necessary to maintain a minimum distance between the contacts in the circuit breaker open position. This requirement has become more stringent as the current ratings of circuit breaker frame sizes have increased while the assemblies have become more compact.

There is shown in copending U.S. patent application entitled, Independent Means for Adjusting Contact Pressure and Contact Arm Position, filed February 21, 1962, Serial No. 174,767, now U.S. Patent 3,198,924 in the names of John C. Brumfield and William W. Poulton, Jr., and assigned to the assignee of the instant application, an extremely advantageous arrangement for accomplishing these various objectives. In that device, the individual movable contact arms are pivotally mounted to a carrier, one for each phase, with all of the carriers being connected to the circuit breaker operating mechanism to operate in unison. A spring member is disposed intermediate the carrier and each of the contact arms. An adjustment means is provided for independently adjusting the contact pressures afforded by the biasing force of the spring urging its respective contact arm about the carrier pivot. A stud member is also provided intermediate the contact arm carrier and each contact arm. The stud passes transversely through an aperture within the contact arm and terminates at the top surface of the contact arm carrier, and is adjustable such that with the contacts separated the abutment of the stud member and the top surface of the contact carrier serves to limit the extent of the contact arm pivotal movement, and thereby maintain the open-gap separation of the contacts.

Previously, the open-gap adjustment stud member had been tightly maintained within the transverse aperture of the contact arm. It has been found however that such a relationship tends to concentrate a considerable portion of the operating forces at the stud member, with the repeated shock loading thereof causing bending or eventual fracture. This problem has become increasingly more critical in conjunction with circuit breakers of increasing interrupting capacity, and hence, increasing spring pressures and operating speeds. Further, misalignment between the pivotal mounting of the contact arm and the stud opening will result in the stud being bent into engagement with the contact carrying arm, rather than passing through its aperture without obstruction.

In circuit breaker frame sizes designed to interrupt high orders of magnitude, it has become the general practice to utilize a plurality of pairs of cooperating contacts for each phase. One of the pairs of contacts, is especially constructed to withstand high arcing temperatures and is designed to be the last to open and first to close when the circuit breaker is operated between its respective positions. In order to achieve sequential operation, and confine the arc between these contacts, the arcing contact is usually associated with a longer contact arm than the main contacts. Because of such a longer contact arm there will be a greater moment associated with the movement of that contact arm, with such increased moment serving to increase the shock forces presented to the adjustment stud thereof. Thus the tendency of such stresses to damage the adjustment stud is particularly severe in the case of the arcing contact structure.

My invention avoids these problems by modifying the interconnection of the open-gap adjustment stud between the carrier and contact arm in a manner which prevents considerable shock loading of the stud member. Specifically, I provide clearance about the transverse opening of the contact arm to establish a loose coupling connection intermediate the stud and its contact carrying arm. The tendency of the stud to move other than in the axial direction will now be permitted by essentially unobstructed movement within the clearance region of the aperture, rather than with high shock impact with the periphery of its aperture.

It should naturally be appreciated that although the employment of my invention is most advantageous in the arcing contact adjustment stud member, its use is not limited to the arcing contact and, may also be employed in conjunction with the main contact arm mounting.

Further, in the previous construction it has been found that severe stresses had been repeatedly applied to the point at which the stud member emerges from the upper surface of the contact arm. If such stresses are continually applied to the same point upon repeated operation of the circuit breaker mechanism, the weakening and ultimate fracture of the stud will be facilitated. In the present invention the loose coupling of the stud permits some rotation during each operation such that the point of application of the stress forces that are generated will be distributed over the circumference of the stud. I thereby accomplish a substantial increase in the life of the stud and attendant increase in circuit breaker reliability.

As a further aspect of my invention, the stud head and contact arm aperature opening include cooperative mating surfaces which permit swiveling of the stud about its axis, so as to compensate for misalignment resulting from manufacturing tolerances.

It is therefore seen that the basic concept of my invention resides in providing a loose coupling interconnection between the open-gap adjustment stud and the contact carrying arm to prevent the establishment of substantial stresses at the stud member.

Accordingly, a primary object of my invention is to provide a circuit breaker construction having high operating forces and possessing increased ability to withstand appreciable shock forces.

Another object of my invention is to provide a circuit breaker construction having a contact carrying arm loosely interconnected to an open-gap adjustment stud.

A further object of my invention is to provide such a loose coupling of the contact arm, wherein the stud passes through a clearance opening within the contact carrying arm, and is free to rotate and/or swivel within such opening.

An additional object of my invention is to provide an improvement over the contact mounting arrangement shown in copending U.S. patent application Ser. No. 174,767, which improvement comprises a loose coupling connection intermediate the open-gap adjustment stud and contact carrying arm to prevent the establishment of substantial stresses in the adjustment stud.

These, as well as other objects of my invention shall become readily apparent after reading the following description of the accompanying drawings in which:

FIGURE 3 is a longitudinal cross-sectional view taken through the center phase, and along the arrows 3—3 as shown in FIGURE 2.

FIGURE 4 is a plan view of the contact operating mechanism.

FIGURE 5 is a longitudinal crosssection view of the contact operating mechanism taken along the line 5—5 of FIG. 4 and showing the novel aspects of my invention.

FIGURE 6 is a cross sectional view taken through line 6—6 of FIG. 5 and looking in the direction of the arrows.

FIGURE 7 is an exploded perspective of the movable contact operating mechanism of one of the end phases.

FIGURE 8 is a fragmentary cross-section showing a modified form of my invention.

Figure 1:
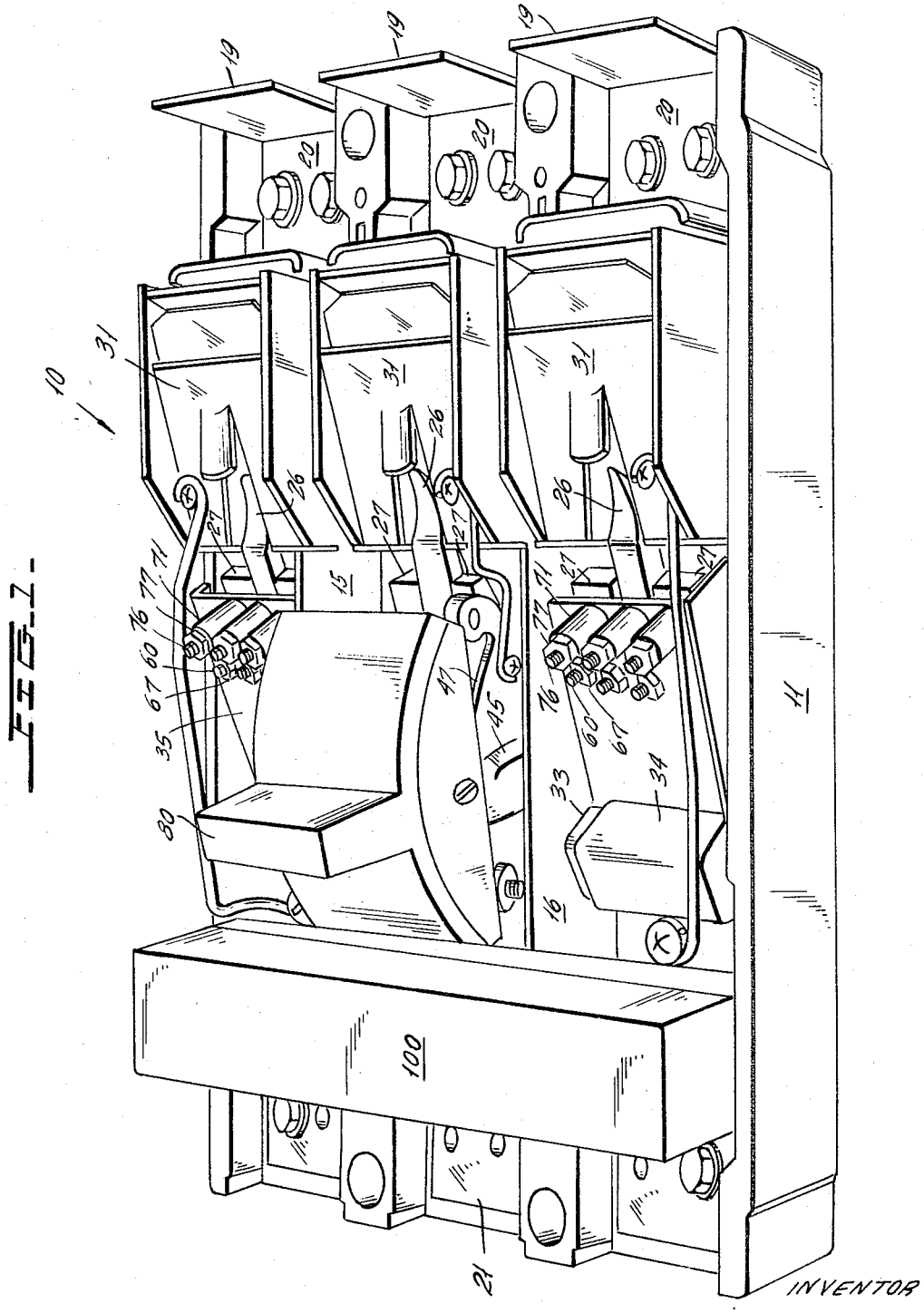
FIG. 1 is a perspective view of a three-phase molded case circuit breaker construction, which may be used in the practice of the instant invention, and wherein the the cover is removed to reveal the internal mechanism thereof.
Figure 2:
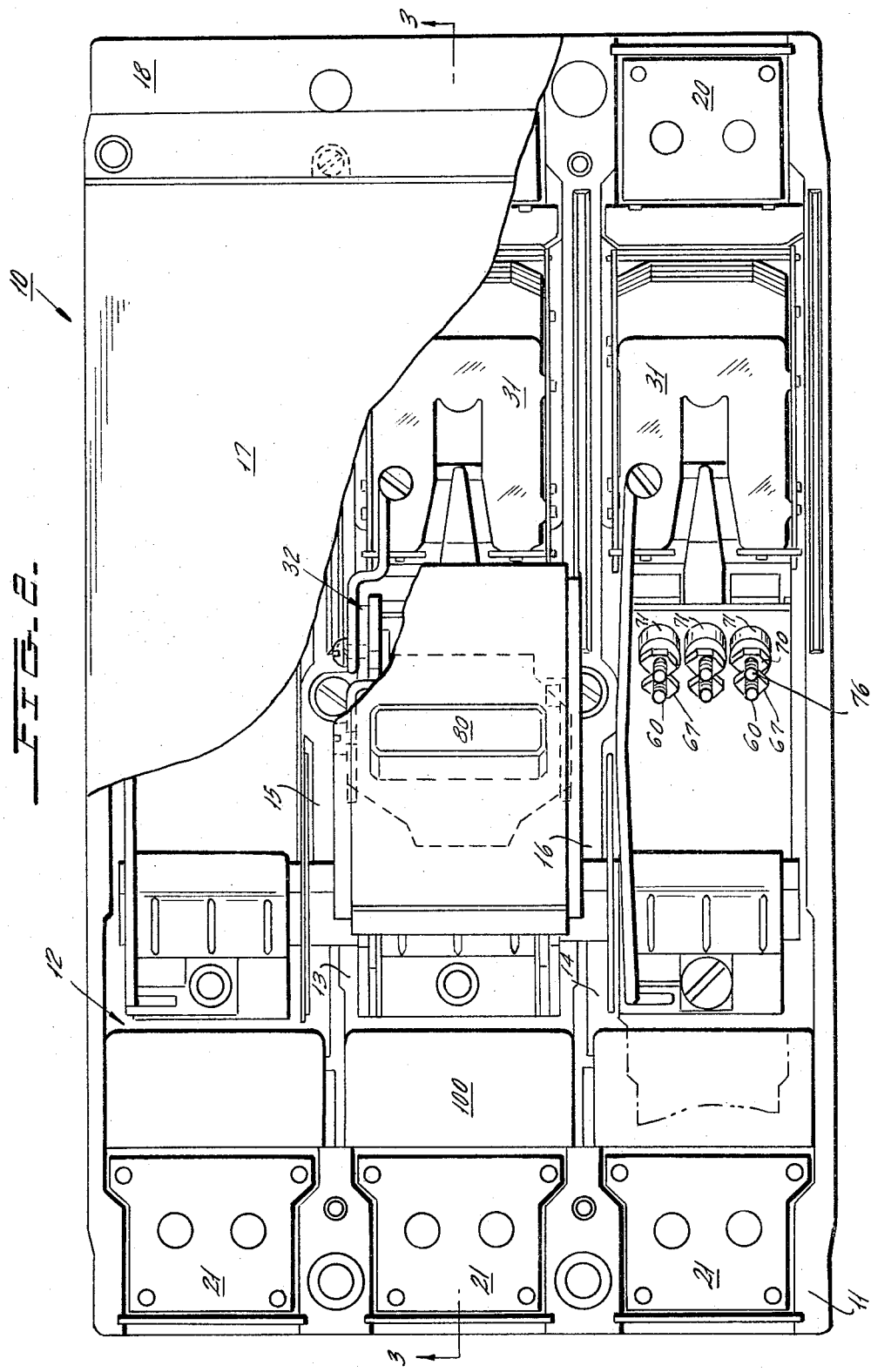
FIG. 2 is a plan view, with the cover replaced and partially cut away, of the circuit breaker shown in FIG. 1.

Now referring to the figures; circuit breaker 10 wherein my invention is incorporated, is typically shown as a commercially available three phase molded case unit. It should be naturally understood that the novel concepts of my invention may be incorporated in numerous other frame sizes and types, with this embodiment being merely for illustrative purposes. The unit is assembled within a housing comprising molded base 11, separated into compartments 12, 13, and 14 respectively for locating the operating members of each of the phases. The adjacent compartments are separated by housing walls 15 and 16. Main cover assembly 17 and end covers 18 similarly include barriers for maintaining the longitudinally extending compartments of the housing, with end shields 19 being located at the line and load ends of the circuit breaker 10.

The current carrying members of all three phases are identical so that for the sake of brevity only one of the sets of elements, such as the center phase as shown in FIG. 3 will be described. The current path between the line terminal strap 20 and load terminal strap 21 proceeds from stationary contacts 22 and 23 to movable contacts 24 and 25 carried by contact arms 26 and 27 through flexible braids 28, contact carrier strap 29 and trip unit strap 30.

Since circuit breaker 10 is of a relatively high current carrying capacity, contacts 22–24 function as arcing contacts and are properly situated to move into engagement and disengagement within the opening defined by circuit breaker arc chute assembly 31. The arcing contacts 22–24 are shown paralleled by two sets of main contacts 23–25. The main movable contacts 25 are each mounted to individual contact arms 27, each connected by an individual section of braid 28 to contact carrier strap 29, while cooperating stationary contacts 23 are mounted to line terminal strap 20. The movable arcing contact 24 is similarly mounted to its contact arm 26, which is connected by a braid section 28 to the strap 29. Its cooperating stationary contact 22 is also mounted to line terminal strap 20. The contact arms 26–27–26 of each phase are, in turn, pivotally mounted by rod 36 to contact carrier 35, as best shown in FIGURE 6.

Circuit breaker 10 also includes an automatic tripping mechanism 100 and a quick make-break toggle operating mechanism 32. Operating mechanism 32 is connected to the contacts of all three phases by means of a transverse insulating tiebar 33, with U-shaped straps 34 connecting the respective contact carriers 35 to the common tiebar 33. Carrier 35 is pivotally mounted at 46 to suitable bearing in the operating mechanism frame 47. Mounting frame 47 includes ears 84 which receive screw members 49 for securement to circuit breaker base embossment 50.

The center phase carrier 35 is connected at its pivot rod 36 to the lower of the operating mechanism toggle linkage 37–38, with the toggle links joined at knee 39. Knee 39 includes a pivotally mounted plate member 40 to which the circuit breaker operating springs, shown as a pair 41–41', are connected at one end 42–42' thereof. The other ends 43–43' are located in suitable apertures with the operating handle frame 45, such that the operating springs 45–45' are in overcenter relationship with respect to toggle linkage 37–38. The lower end of handle frame member 45 is pivotally mounted to bosses 83 of operating mechanism frame 47. Operating handle 80 is mounted to upstanding posts 81 of frame member 45.

The operating mechanism 32 also includes a cradle connected latch tip 51 in engagement with bracket extension 52 of the trip assembly 100. Bracket extension 52 is coupled to tripple bar 53 so as to effect tripping disengagement of latched members 51, 52 upon counter-clockwise movement of tripple bar 53. Such counter-clockwise movement may be effected by the engagement of elongated bi-metallic member 54 and tripple bar adjustment screw 55 or the downward movement of the instantaneous trip plunger rod 56 with the accompanying engagement of adjustable screw head 57 and trip bar extension 58.

As is fully discussed in the aforementioned copending U.S. application 174,767, individual adjusting studs 60 are provided to establish the open circuit positions of contacts 24, 25 relative to stationary contacts 22–23, as shown in the open position of FIG. 3. Stud 60 extends upwardly through contact arm clearance aperture 61, dimensioned in accordance with my invention to provide a loose coupling connecting so as to permit predetermined movement between stud member 60 and the contact carrying arm apertures 61 when subject to conditions of misalignment, or excessive shock loading. The lower end of stud member 60 includes an outwardly flared head 63 which mates with cooperatively shaped countersunk surfaces 64 at the lower extent of aperture 61. The forward end 65 of the stud 60 extends through oversized aperture 66 in the contact carrier 35. Nut 67 having spring fingers is threadedly mounted to each stud 60 and when circuit breaker 10 is in the open position will rest against the upper surface of carrier 35 so as to establish the gap separation between the cooperating pair of contacts.

Contact pressure adjustment is provided by compression springs 70, with an individual spring 70 being provided for each of the contact arms. Spring 70 is maintained within mounting tube 71, the lower end of which is flared outwardly at 72 to be maintained within the respective aperture 78 of the carrier 35. The lower end of spring 70 is entered into guide recesses 74 of the contact arm 26, 27. The upper end of spring 70 bears against the disc 75. The spring contact pressure is adjusted by threaded rod 76, the upper end of which preferably has an Allen head recess. Once the contact pressure is adjusted, the setting is maintained by threaded lock nut 77.

Compression springs 70 bias their respective contact arms 26–27 clockwise, as shown in the figures, about pivotal mounting rod 36. In the open position this clockwise movement is limited by the engagement of nuts 67 and the top surface of the carrier 35. Referring specifically to FIG. 5, it should be recognized that should stud member 60 be tightly maintained within its aperture 61, as shown in aforementioned U.S. Patent Application 174,767, the shock forces generated during the closing of the contact operating mechanism will to a substantial degree be transmitted to the interconnection of stud 60 and the respective contact carrying arms. This condition will be particularly severe should there be misalignment, resulting in stud member 60 not being in the direction of the line of forces. Under such conditions the stud will tend to bend, with the forces being particularly concentrated at the region where stud member 60 emerges from the top surface of its respective contact arm, as shown by point X of FIG. 5.

FIGURE 8 shows a modified form of my invention wherein the head 63' of stud 60 has a spherical configuration and mates with a similar spherical surface 64' at the bottom of the contact carrying arm. Such mating spherical surfaces serve to further facilitate pivotal movement of the stud 60 about the mating spherical surfaces in a manner permitting swiveling movement of the stud 60, on its axis 85 in conjunction with rotation thereof about the axis. This will further improve the manner in which the shock forces previously concentrated at a small region of the stud may be minimized, with such minimum forces distributed about the stud circumference upon repeated closing operations.

The concentration of stress forces acting on open-gap adjustment stud 60 has been found to be particularly severe with respect to the arching contact arm 26. This is caused by the appreciably greater movement arm due to the increased length of this contact arm; that is, the distance between the arcing contact 24 and the common pivot point 36 is substantially greater than the distance between the main contacts 25 and the common pivot point 36. It is also to be noted that wherein the distance between the stud 60 and main contact 25 is in the same order as is the distance between the stud and the common pivot point 36, the distance between arcing contact 24 and its stud 60 is appreciably greater, being somewhat in the order of twice that distance. Accordingly, the forces generated within the acring contact arm 26 will have a considerably greater shock effect on its stud 60 due to this increased moment arm. Accordingly, my invention has found it most advantageous employment in conjunction with the adjustment stud 60 of contact arm 26 of the arcing contact 24. However, it may likewise be used in conjunction with the adjustment stud mounting of the main contact arms 27, with such utilization being determined by the anticipated shock forces established by the operating mechanism springs 41, 41', during the quick make closing operation.

It is therefore seen that this invention provides an improved interconnection between the contact carrying arm and open-gap adjustment stud to limit the shock loading of the stud and thereby serve to increase the anticipated life expectancy and reliability of the circuit breaker assembly. It should further be recognized that these improvements are provided without the addition of any components and without any significant increase of either parts or fabrication time.

Although I have described preferred embodiments of my novel invention, many variations and modifications will now me obvious to those skilled in the art, and I prefer therefore to be limited not by the specific disclosure herein but only by the appended claims.

The embodiments of the invention in which an exclusive privilege or property is claimed are defined as follows:

1. A circuit breaker comprising a pair of cooperating contacts, a contact arm carrying one of said contacts; operating means connected to said contact arm for moving said contact arm between a first and a second position wherein said contacts are disengaged and engaged, respectively; said operating means including a carrier having a pivot means to which said contact arm is mounted; a stud interposed between said carrier and said contact arm; said contact arm including an aperture with said stud extending therethrough; a first end of said stud located at the top surface of said carrier and a second end of said stud located at the bottom surface of said contact arm; said contact arm aperture having a cross-sectional area sufficiently greater than said stud to permit predetermined movement of said stud within said aperture.

2. A circuit breaker comprising a pair of cooperating contacts, a contact arm carrying one of said contacts; operating means connected to said contact arm for moving said contact arm between a first and a second position wherein said contacts are disengaged and engaged, respectively; said operating means including a carrier having a pivot means to which said contact arm is mounted; a stud interposed between said carrier and said contact arm; said contact arm including an aperture with said stud extending therethrough; a first end of said stud located at the top surface of said carrier and a second end of said stud located at the bottom surface of said contact arm; said contact arm aperture having a cross-sectional area sufficiently greater than said stud to permit predetermined movement of said stud within said aperture; said contact arm having a first and second end, said pivot means connected at said first end and said one contact located at said second end; said stud and contact arm aperture located intermediate said first and second ends.

3. A circuit breaker as set forth in claim 2, wherein said intermediate location separated from said pivot means by a first distance, and separated from said one contact by a second distance; said second distance appreciably greater than said first distance.

4. A circuit breaker comprising a pair of cooperating contacts, a contact arm carrying one of said contacts; operating means connected to said contact arm for moving said contact arm between a first and a second position wherein said contacts are disengaged and engaged, respectively; said operating means including a carrier having a pivot means to which said contact arm is mounted; a stud interposed between said carrier and said contact arm; said contact arm including an aperture with said stud extending therethrough; a first end of said stud located at the top surface of said carrier and a second end of said stud located at the bottom surface of said contact arm; said contact arm aperture having a cross-sectional area sufficiently greater than said stud to permit predetermined movement of said stud within said aperture; said stud second end having an enlarged head, and said aperture at the bottom surface of said contact arm shaped to cooperatively mate with said enlarged head; said cooperatively mating surface shaped to facilitate rotation of said stud with said aperture.

5. A circuit breaker comprising a pair of cooperating contacts, a contact arm carrying one of said contacts; operating means connected to said contact arm for moving said contact arm between a first and a second position wherein said contacts are disengaged and engaged, respectively; said operating means including a carrier having a pivot means to which said contact arm is mounted; a stud interposed between said carrier and said contact arm; said contact arm including an aperture with said stud extending therethrough; a first end of said stud located at the top surface of said carrier and a second end of said stud located at the bottom surface of said contact arm; said contat arm aperture having a cross-sectional area sufficiently greater than said stud to permit predetermined movement of said stud within said aperture; said stud second end having an enlarged head, and said aperture at the bottom surface of said contact arm shaped to cooperatively mate with said enlarged head; said cooperatively mating surfaces shaped to facilitate swiveling of said stud.

6. A circuit breaker comprising a pair of cooperating contacts, a contact arm carrying one of said contacts; operating means connected to said contact arm for moving said contact arm between a first and a second position wherein said contacts are disengaged and engaged, respectively; said operating means including a carrier having a pivot means to which said contact arm is mounted; first means connected between said contact arm and said carrier for establishing said first position, and second means connected intermediate said contact arm and carrier for establishing pressure between said contacts when said arm is in said second position, said first means including a stud interposed between said carrier and said contact arm; said contact arm including an aperture with said stud extending therethrough; a first end of said stud located at the top surface of said carrier and a second end of said stud located at the bottom surface of said contact arm; said contact arm aperture hving a cross-sectional area sufficiently greater than said stud to permit predetermined movement of said stud within said aperture.

7. A circuit breaker comprising a pair of cooperating contacts, a contact arm carrying one of said contacts; operating means connected to said contact arm for moving said contact arm between a first and a second position wherein said contacts are disengaged and engaged, respectively; said operating means including a carrier having a pivot means to which said contact arm is mounted; first means connected between said contact arm and said carrier for establishing said first position, and second means connected intermediate said contact arm and carrier for establishing pressure between said contacts when said arm is in said second postion; said first and second means operatively related such that said first position established by said first means remains fixed while said second means is adjusted, and said pressure established by said second means remains fixed while said first position is adjusted, whereby said first and second means are independently adjustable; said first means including a stud interposed between said carrier and said contact arm; said contact arm including an aperture with said stud extending therethrough; a first end of said stud located at the top surface of said carrier and a second end of said stud located at the bottom surface of said contact arm; said second means including spring means urging said contact arm in a first direction about said pivot means toward the other of said contacts; said first end of said stud abutting said carrier top surface, when in said first condition for establishing said contact arm in first position; said contact arm aperture having a cross-sectional area sufficiently greater than said stud to permit predetermined movement of said stud within said aperture.

8. A circuit breaker as set forth in claim 7, wherein said differences in cross-sectional area providing a loose connection between said stud and contact arm; said aperture and stud including cooperative mating surface to facilitate relative movement therebetween.

9. A circuit breaker comprising at least a first and a second pair of cooperating contacts, a first contact arm carrying one of said contacts of said first pair, and a second contact arm carrying one of said contacts of said second pair; operating means connected to said contact arms for moving each of said contact arms between a first and a second position wherein said contacts are disengaged and engaged, respectively; said operating means including a carrier having a pivot means to which both of said contact arms are mounted; a stud interposed between said carrier and each of said contact arms; said contact arms each including an aperture with its respective stud extending therethrough; a first end of said stud located at the top surface of said carrier and a second end of said stud located at the bottom surface of its respective contact arm; said contact arms having a first and second end, said pivot means connected at said first ends and each of said one contacts located at the second end of its respective contact arm; each of said stud and contact arm apertures located intermediate said first and second ends; said intermediate location separated from said pivot means by a first distance, and separated from said one contact by a second distance; said second distance of each of said contact arms appreciably greater than said first distance; said second distance of said first contact arm significantly greater than the second distance of said second contact arm; said aperture of at least said first contact arm having a cross-sectional area dimensioned to provide clearance with its cooperating stud and providing a loose connection between said stud and contact arm.

10. A circuit breaker comprising at least a first and a second pair of cooperating contacts, a first contact arm carrying one of said contacts of said first pair, and a second contact arm carrying one of said contacts of said second pair; operating means connected to said contact arms for moving each of said contact arms between a first and a second position wherein said contacts are disengaged and engaged, respectively; said operating means including a carrier having a pivot means to which both of said contact arms are mounted; a stud interposed between said carrier and each of said contact arms; said contact arms each including an aperture with its respective stud extending therethrough; a first end of said stud located at the top surface of said carrier and a second end of said stud located at the bottom surface of its respective contact arm; each of said contact arms including first means connected between said contact arm and said carrier for establishing said first position, and second means connected intermediate said contact arm and carrier for establishing pressure between said contacts when said arm is in said second position, said first and second means operatively related such that said first position established by said first means, remains fixed while said second means is adjusted, and said pressure established by said second means remains fixed while said first position is adjusted, whereby said first and second means are independently adjustable; said second means including spring means urging said contact arm in a first direction about said pivot means toward the other of said contacts; said first end of said stud abutting said carrier's top surface, when in said first condition for establishing said contact arm's first position; said contact arms having a first and second end, said pivot means connected at said first ends and each of said contacts located at the second end of its respective contact arm; each of said stud and contact arm apertures located intermediate said first and second ends; said intermediate location separated from said pivot means by a first distance, and separated from said one contact by a second distance; said second distance of each of said contact arms appreciably greater than said first distance; said second distance of said first contact arm significantly greater than the second distance of said second contact arm; said aperture of at least said first contact arm having a cross-sectional area dimensioned to provide clearance with its cooperating stud and providing a loose connection between said stud and contact arm; said aperture and stud including cooperative mating surface to facilitate relative movement therebetween.

No references cited.

ROBERT K. SCHAEFER, *Examiner*.